United States Patent Office 2,694,054
Patented Nov. 9, 1954

2,694,054

POLYMERIZATION PROCESS USING VINYL CHLORIDE AS DILUENT

Robert M. Thomas, Westfield, N. J., and Augustus B. Small, Baton Rouge, La., assignors to Standard Oil Development Company, a corporation of Delaware No Drawing. Application May 1, 1951, Serial No. 224,048

9 Claims. (Cl. 260—85.3)

This invention relates to a novel low temperature polymerization process and relates particularly to the use of vinyl chloride as a diluent for the catalyst and for the reactants in olefinic polymerizations in which catalysts of the Friedel-Crafts type are employed.

It has previously been known to produce synthetic resinous and rubber-like bodies by a variety of polymerization proceses, including the low temperature polymerization of olefins and diolefins, particularly isobutylene, either alone or in the presence of various selected mono- and poly-olefins. These well-known polymerization processes are carried out by the application to the olefin reactants of a Friedel-Crafts catalyst, the preferred reaction temperatures ranging from 0° C. to −100° C. or lower to −165° C. The present invention is based upon the discovery that vinyl chloride possesses superior qualities when employed as a diluent for a feed and the catalyst in various types of low temperature Friedel-Crafts polymerization reactions.

Among the polymerization reactions in which the present invention is applicable is the polymerization of olefins having from 4 to 14, inclusive, carbon atoms per molecule, and preferably between 4 to 8, inclusive, carbon atoms per molecule. The invention is valuable for polymerization of iso-olefins alone, in the presence of suitable catalysts such as boron fluoride, aluminum chloride, aluminum bromide, and the like, added alone or in solution in a solvent. The formation of homo-polymers of these iso-olefins, such as isobutylene, is of particular importance and can be carried out with any type of low temperature polymerization catalyst selected from the well-known class of Friedel-Crafts agents. Control of the reaction to form the homo-polymer is essential in order to prevent the formation of polymers having molecular weights which are either too high or too low. The catalyst may be employed in amounts from less than 0.1–0.5% of active catalyst up to 2 or 3% for more rapid and more complete reaction of the olefins.

It is generally desirable to employ a diluent for the reaction and, according to the present invention, vinyl chloride is contemplated for this use. In the polymerization of isobutylene, for instance, the resulting product is very viscous and may be from sticky to semi-solid or solid and rubber-like consistency, depending upon the molecular weight. The product is colorless and clear and soluble in liquid hydrocarbons. Polymerized products prepared from isobutylene having a Staudinger molecular weight of between 1,000 and 500,000 are possible, and those of 200,000 to 400,000 are of particular value.

It is further contemplated to use vinyl chloride as the catalyst and reactant diluent in polymerization reactions for preparing tough, thermoplastic copolymers from an iso-olefin having from 4 to 8, inclusive, carbon atoms per molecule, such as iso-amylene or preferably isobutylene, copolymerized with a styrene, such as alpha methyl styrene, para methyl styrene, or preferably with styrene itself. These resinous copolymers are prepared by polymerizing a mixture of 5 to 80, preferably 10 to 60, weight percent of styrene with the balance of the iso-olefin at low temperatures, preferably between about −60° C. and −150° C., using a Friedel-Crafts catalyst as, for example, boron fluoride or aluminum chloride or aluminum bromide or a hydroxy derivative thereof. It is usually desirable to prepare the Friedel-Crafts catalyst in the form of a solution having from 0.1 up to 5% concentration of active catalyst present. Vinyl chloride is especially advantageous for use as the catalyst diluent, although small amounts of suitable solvents such as the mono- or poly-halogenated alkanes of 1 to 3 carbon atoms which are unreactive and liquid at the polymerization temperature may also be employed to assist in solubilizing the Friedel-Crafts catalyst. Examples of liquids which may be employed in such small amounts include methyl bromide, methyl chloride, methylene chloride, ethyl chloride, and the like.

In preparing these iso-olefin-styrene copolymers, it is usually desirable to dilute the reactive monomers of the polymerization mixture with about 1 to 10, preferably 2 to 5, volumes of an inert diluent per volume of reactive olefinic feed. Preferably, vinyl chloride is employed as the diluent. The polymerization mixture is cooled either internally or externally and the catalyst added to the cold polymerization mixture. The general technique of preparing this type of styrene copolymer is well known and broadly described in United States Patent Number 2,274,749, issued to William H. Smyers.

As a further type of polymer which may be prepared by this polymerization employing vinyl chloride as a diluent, there may be included the low temperature polymerization process in which an iso-olefin and a multi-olefin, particularly a conjugated diolefin, are polymerized to form interpolymers. It is well known that a valuable interpolymer may be produced by copolymerizing an iso-olefin having from 4 to 8, inclusive, carbon atoms per molecule, such as isobutylene, with a multi-olefin, preferably a conjugated diolefin such as butadiene or isoprene, at temperatures ranging from 0° C. to −165° C., by the application thereto of a Friedel-Crafts type catalyst, the catalyst preferably being in solution in a low-freezing, non-complex-forming solvent. The resulting polymerization reaction yields solid, rubber-like polymers of high molecular weight which are reactive with vulcanizing agents such as sulfur in a curing reaction somewhat analogous to a vulcanization of natural rubber.

In order to produce this valuable interpolymer, isobutylene is employed as one of the preferred components but other iso-olefins, preferably of 4 to 6, inclusive, carbon atoms per molecule, such as 2-methyl butene-1, 2-methyl pentene-1, or 2-methyl hexene-1, may be employed. 99 to 40 weight percent of the iso-olefin is mixed with from 1 to 60 weight percent of a multi-olefin having 4 to 12, inclusive, carbon atoms per molecule, preferably a conjugated diolefin, such as butadiene or isoprene. Other multi-olefins which may be used, however, include piperylene, dimethyl butadiene, cyclopentadiene, dimethallyl, or myrcene. For most purposes, the conjugated diolefins having from 4 to 6, inclusive, carbon atoms per molecule are much preferred. A preferred reaction mixture consists of a major proportion of iso-olefin admixed with a minor proportion of diolefin. The olefinic reaction mixture, usually diluted with 1 to 3 volumes of inert diluent consisting predominantly of vinyl chloride, per volume of mixture, is cooled to a temperature within the range of from −20° C. to −100° C. or even as low as −165 °C. either externally by the use of a refrigerating jacket around the reactor or internally by admixture with the polymerizable olefins of a refrigerant such as liquid propane, liquid ethane, liquid ethylene, or even liquid methane.

The polymerization is caused to occur by application to the thus prepared cold olefin reaction mixture of a Friedel-Crafts metal halide catalyst in the presence of vinyl chloride. Vinyl chloride is particularly valuable since it does not form a complex with the catalyst and remains substantially liquid at the polymerization temperature. The use of vinyl chloride makes polymerizations possible at an ultra low temperature level where cross-linking and possibly other side reactions of the multi-olefins are suppressed; in fact, in making isobutylene-diolefin copolymers, conditions can be such that reactants and catalyst can be combined completely before reaction occurs. The use of vinyl chloride as the predominant diluent is of especial value in that, under otherwise favorable conditions, more highly unsaturated isobutylene-diolefin copolymers can be prepared. As is indicated in the data of the tables shown below, the use of vinyl chloride results in better polymerization efficiency for the diolefin. This increased reaction efficiency is evidenced by higher unsaturation values and tighter cures of the polymer. This may partially be because of less cross-linking.

The Friedel-Crafts catalyst may be aluminum chloride, aluminum bromide, aluminum iodide, boron fluoride, double salts ranging in composition from aluminum dichlorobromide pentabromo chloride, aluminum bromide-aluminyl bromide, titanium tetrachloride, titanium chloro acetate, hydroxylated aluminum halides, uranium tetrachloride, mixed alkylated aluminum halides, and other known active Friedel-Crafts halogen compounds and their equivalents. For the catalyst solvent or diluent, it is of course advantageous to employ vinyl chloride, the same diluent as is employed in the reactant stream. In many cases, however, it is preferable to use a catalyst solution which contains both vinyl chloride and conventional solvent.

Thus, the catalyst solution, for example aluminum chloride in a solvent consisting substantially of vinyl chloride, is applied to the cold mixed olefinic material in the form of a spray delivered onto the surface of the rapidly stirred olefinic polymerization mixture. Alternatively, the catalyst solution may be delivered as a jet into a zone of high turbulence in the olefinic material in any convenient way or it may be delivered in any convenient manner which obtains a rapid dispersion of the catalyst solution into the cold olefinic mixture. Operating in this fashion, the copolymerization of the iso-olefin with the conjugated diolefin proceeds rapidly to yield a solid polymer having a Staudinger molecular weight which may vary between 20,000 and 100,000.

The use of vinyl chloride as diluent for the catalyst and/or reactants in these typical low temperature polymerization reactions gives polymers and resins of unexpected and novel characteristics and, if desired, allows the polymerization reaction to be carried out in a novel and unpredictable manner.

As a specific example of a novel manner for carrying out a polymerization reaction in which a polymer is frozen out, it has been found that mixtures containing a major proportion of isobutylene and a minor proportion of a diolefin, for instance, isoprene, when chilled to a temperature of about −150° C., do not polymerize when a catalyst also chilled to about −150° C. is added. This allows mixing of the feed and catalyst solutions in any appropriate or desired proportions without the interference of having the polymerization reaction take place to any degree. By removing the refrigeration and allowing the mixture to warm up, up to 100% conversion can be obtained to produce the polymer. It has been found that the polymer produced in such a manner has unusual and unexpected properties. Thus, the polymers have a higher unsaturation value as shown by the standard bromination and mercuric acetate unsaturation tests. In addition, the presence of greater unsaturation permits the obtaining of tighter cures for the novel polymers. Vinyl chloride is an especially good solvent and diluent for use in carrying out the type of operation in which the copolymer is frozen out, since the freezing point for vinyl chloride is satisfactorily low (about −160° C.) and its tolerance for a Friedel-Crafts catalyst, such as aluminum chloride, is quite satisfactory. However, it is impossible to obtain these conditions in the conventional polymerization systems since the solvents and diluents usually employed have freezing points about −150° C. For example, methyl chloride, which is commonly employed in the preparation of isobutylene-diolefin copolymers, freezes at −97° C.

Polymers and copolymers prepared using vinyl chloride as a diluent and catalyst solvent, may be brought up to room temperature from the temperature of the polymerization mixture in any convenient manner. One preferred procedure is to dump the entire reaction mixture into warm water or a warm alkaline aqueous solution or warm alcohol or the like in order to flash off remaining monomers and other volatile ingredients present in the reaction mixture, quench the catalyst, and start the purification of the polymerized product. The polymer is then finished by washing on a roll mill with clear water to obtain further and more complete purification or it may, if desired, be purified in any of a number of well-known ways.

Friedel-Crafts catalyst solutions for use in a vinyl chloride polymerization system are preferably prepared in two steps. This is particularly desirable since active Friedel-Crafts catalysts, for instance, aluminum chloride, attacks vinyl chloride at temperatures above about −25° C. to −30° C. Furthermore, the solubility rate of Friedel-Crafts catalysts, such as aluminum chloride, in vinyl chloride follows the usual solubility rule in that in cold vinyl chloride, for instance, below −30° C., the solubility rate of the solid catalyst material is very slow. In order to overcome this, it has been found quite satisfactory from a practical point of view to prepare a concentration solution of the Friedel-Crafts catalyst in a suitable solvent, for instance, a concentrated solution of aluminum chloride in methyl or ethyl chloride. The concentrated solution is then diluted at a low temperature to the desired concentration with the appropriate volume of vinyl chloride. In carrying out the polymerizations and copolymerizations of the invention, it has been found that the final catalyst solution advantageously contains between 5% and 50% of the more active solvent as, for instance, methyl chloride, and from 50% to 95% vinyl chloride. The catalyst concentrations to be employed correspond generally to those normally used for the polymerization involved.

The examples shown below describe a number of specific embodiments of the invention, although it is not intended to limit the scope thereto.

EXAMPLE I

An olefinic feed mixture of isobutylene and isoprene containing about 3% by weight of isoprene based on the amount of isobutylene employed, was used in run Nos. 1–4, inclusive. All the polymerizations were carried out in a batch type reactor externally refrigerated with liquid ethylene at about −94° C. and internally agitated. In each case, a polymerization feed was employed having 2 volumes of the indicated diluent to 1 volume of hydrocarbon reactant. Run No. 1 was carried out employing only methyl chloride as feed diluent and as catalyst solvent and diluent. Run No. 2 employed vinyl chloride as the feed diluent, but used only methyl chloride as the solvent for the aluminum chloride catalyst. Run Nos. 3 and 4 employed vinyl chloride as the feed diluent and also as a catalyst solvent and diluent, the catalyst solution being prepared by diluting a methyl chloride catalyst concentrate (1.6 grams aluminum chloride/100 cc.) to 0.26 gram of aluminum chloride/100 cc. with vinyl chloride at −78° C. In general, from 100 to 1,000 grams of copolymer were made per gram of active catalyst used. The results obtained in these comparative runs are shown in the data recorded in Table I below.

The formulation used in comparing the samples for the curing tests was as follows:

| Component: | Parts by weight |
|---|---|
| Polymer | 100 |
| Zinc oxide | 5 |
| Stearic acid | 3 |
| EPC carbon black | 50 |
| Tetramethyl thiuram disulfide | 1 |
| Mercaptobenzothiazole | 0.5 |
| Sulfur | 2 |

*Table I*

COMPARATIVE STUDIES ON ALTERNATE FEED DILUENT AND CATALYST SOLVENT

| Run No | 1 | 2 | 3 | 4 |
|---|---|---|---|---|
| Diluent | $CH_3Cl$ | Vinyl Chloride | Vinyl Chloride | Vinyl Chloride |
| Catalyst Composition: | | | | |
| Vol. Percent $CH_3Cl$ | 100 | 100 | 20 | 20 |
| Vol. Percent Vinyl Chloride | | | 80 | 80 |
| Conc. g./$AlCl_3$/100 cc | 0.25 | 0.25 | 0.26 | 0.26 |
| Vol. used, cc | 108 | 110 | 115 | 75 |
| Percent Conversion | 23 | 19 | 15 | 27 |
| Catalyst Efficiency | 560 | 440 | 250 | 880 |

Table I—Continued
COMPARATIVE STUDIES ON ALTERNATE FEED DILUENT AND CATALYST SOLVENT

| Run No | 1 | 2 | 3 | 4 |
|---|---|---|---|---|
| Mooney Viscosity: | | | | |
| 1.5 min | 70 | 80 | | 90. |
| 8 min | 66 | 77 | | 99. |
| Mol. Wt. (Staudinger) | 46,000 | 57,000 | 60,000 | 65,000. |
| Unsaturation: | | | | |
| Bromination Method | 1.46 | 1.75 | 1.75 | 1.65. |
| Mercuric Acetate Method | 0.46 | 0.57 | | |
| Percent Low Ends | 4.3 | 4.6 | | |
| Cure @ 307° F., 20 min.: | | | | |
| tensile strength | 2,925 | 2,750 | | 2,850. |
| 300% modulus | | | | 660. |
| 400% modulus | 540 | 760 | | 990. |
| Percent elongation | 900 | 760 | | 790. |
| Cure @ 307° F., 40 min: | | | | |
| tensile strength | 3,025 | 2,825 | | 3,100. |
| 300% modulus | | | | 1,000. |
| 400% modulus | 790 | 1,160 | | 1,430. |
| Percent elongation | 790 | 670 | | 660. |

It is noteworthy that replacement of the methyl chloride with vinyl chloride resulted in a polymer product having higher Mooney viscosity values and higher Staudinger molecular weights. Run No. 4 of this example shows better utilization of the diolefins in feed as the polymer obtained has higher unsaturation and gives a more tightly cured product.

It is also to be noted from Table I above that the improvement in polymer quality is even more striking when vinyl chloride is employed both for the feed diluent and for the catalyst solvent and diluent.

EXAMPLE II

Table II below shows the comparative data obtained on tests of a standard GR–I sample and a wide molecular weight sample of copolymerized isobutylene and isoprene. The GR–I type polymer is prepared from a mixture of isobutylene and isoprene in which there is about 2.5% isoprene in the olefin feed mixture based on the isobutylene used, the polymerization being carried out by means of a polymerization catalyst consisting of aluminum chloride dissolved in methyl chloride. The olefin feed mixture is diluted with methyl chloride. The polymer used for comparison with standard GR–I was prepared in a similar process, but employing vinyl chloride as a diluent both for feed and catalyst and was frozen out over the comparatively wide temperature range of from −155° C. to approximately −40° C. The polymer so produced has unusual properties in that it has flow characteristics usually shown by high Mooney polymers but actually has a low Mooney value.

Table II
WIDE RANGE MOLECULAR WEIGHT BUTYL

| | Wide Range Molecular Weight Sample | Standard GR–I Sample |
|---|---|---|
| Mol. Wt. (Staudinger) | 43,000 | 37,000 |
| Percent Low Ends | 17 | 9 |
| Mol. Percent Unsaturation [1] | 1.85 | 1.6 |
| Mooney Viscosity: | | |
| 1.5 min | 42 | 47 |
| 8 min | 37 | 43 |
| Calc. Mooney Viscosity, 8 min | 36 | 45.5 |
| Extrusion: | | |
| inches/min | 22 | 41 |
| grams/min | 78 | 90 |
| Cure @ 307° F., 30 min.: | | |
| tensile strength | 2,250 | 2,800 |
| 400% modulus | 510 | 700 |
| Percent elongation | 940 | 820 |

[1] Bromination method.

EXAMPLE III

Table III below shows a comparison of the flow characteristics of isobutylene-isoprene copolymers prepared by various methods. Sample A was prepared by polymerizing an isobutylene-isoprene mixture in a batch operation using vinyl chloride as the diluent for both the feed mixture and aluminum chloride catalyst. The polymer was prepared by a freezing out process over a temperature range of from about −155° C. to approximately −40° C. The GR–I sample was prepared by the standard continuous commercial process for preparing isobutylene-isoprene copolymers. Sample B was prepared in a batch type reaction in which methyl chloride was employed as a diluent for both feed and the aluminum chloride catalyst. The flow characteristics of these polymer samples were measured at about 80° F. on a formulation containing 50 parts of mixed carbon black per 100 parts of polymer. It is evident from the data of Table III that the extrusion and flow characteristics of the polymer prepared in the presence of vinyl chloride as a diluent for the feed and catalyst are those of a tough, elastic, highly useful copolymer.

These data indicate that the freezing out technique employing vinyl chloride as the feed and catalyst diluent is entirely feasible and practical and gives a good quality polymer product. These data also show better utilization of unsaturation in feed at the lower temperatures. The mole percent unsaturation of the product is higher and the moduli of vulcanization are greater.

The higher values shown in recovered deformation mean less viscous flow and more elastic qualities, since the polymer recovers more completely from deformation.

Table III
WIDE RANGE MOLECULAR WEIGHT BUTYL FLOW CHARACTERISTICS

| Sample | Mooney Viscosity, 8 Min. | Compression Time, Min. | Total Deformation | Unrecovered Flow | | Flow Ratio Deformation | | Recovered Deformation, Percent |
|---|---|---|---|---|---|---|---|---|
| | | | | 10 min. Rest | Heated [2] | 10 Min. Rest | Heated [2] | |
| A [1] | 37 | 1 | 27.4 | 3.8 | 0.9 | 0.14 | 0.03 | 26.5 |
| | | 3 | 38.5 | 10.7 | 1.9 | 0.28 | 0.05 | 36.4 |
| | | 7 | 47.1 | 23.7 | 5.7 | 0.50 | 0.12 | 41.4 |
| GR–I | 43 | 1 | 19.3 | 4.9 | 3.7 | 0.25 | 0.19 | 15.6 |
| | | 3 | 28.6 | 12.2 | 7.7 | 0.43 | 0.27 | 20.9 |
| | | 7 | 38.0 | 23.4 | 14.9 | 0.62 | 0.39 | 23.1 |
| B | 73 | 1 | 12.9 | 2.1 | 1.7 | 0.16 | 0.13 | 11.2 |
| | | 3 | 17.9 | 4.7 | 2.9 | 0.26 | 0.16 | 15.0 |
| | | 7 | 23.5 | 10.1 | 4.7 | 0.43 | 0.20 | 18.8 |
| Natural Rubber [3] | | 1 | 40.2 | 4.9 | 2.9 | 0.12 | 0.07 | 37.3 |
| | | 3 | 47.3 | 9.2 | 3.0 | 0.19 | 0.06 | 44.3 |
| | | 7 | 51.4 | 18.5 | 5.0 | 0.36 | 0.10 | 46.4 |

[1] Vinyl chloride used as diluent for both feed mixture and aluminum chloride catalyst.
[2] Heated for 15 minutes at 176° F. and then allowed to cool before measuring.
[3] Estimated to be about 40 Mooney viscosity.

This would give greater "bruise resistance" in making inner tubes, for example.

EXAMPLE IV

Batch polymerization reactions were carried out employing vinyl chloride as the diluent for the isobutylene-isoprene feed and for the aluminum chloride catalyst. The data indicated in Table IV show that a variation in the maximum temperature for a given charge of feed and catalyst produces an increased quantity of polymer corresponding to the rise in maximum temperature. Runs 5, 6, 7, and 8 were made in a small batch reactor employing about 120 cc. as a charge of feed. The reactor was refrigerated externally with liquid nitrogen and a reactor temperature of between —149° C. and —160° C. was maintained during the addition of catalyst, this being the temperature at which substantially no polymerization occurs under the conditions employed. The feed employed consisted of a mixture of isobutylene and isoprene, the isoprene content being about 3% by weight based on the isobutylene used. Vinyl chloride was used as the feed diluent in each run. The catalyst employed consisted of about 20% methyl chloride catalyst concentrate of dissolved aluminum chloride and 80% vinyl chloride diluent. This catalyst solution was pre-chilled to about —78° C. before its addition to the reactor containing the olefin feed. In each of the four runs, after the indicated amount of catalyst was added, agitation was continued and the temperature was maintained at approximately the maximum temperature indicated for a period of time varying from about 1 to 2 hours. At the end of that time, alcohol was added and the polymer was worked up in the usual fashion.

Table IV

BATCH POLYMERIZATION DATA OBTAINED IN VINYL CHLORIDE SYSTEM AT DIFFERENT TEMPERATURES

| Run No. | 5 | 6 | 7 | 8 |
|---|---|---|---|---|
| Temperature: | | | | |
| Min. °C | —158 | —160 | —160 | —163 |
| Max. °C | —149 | —140 | —130 | —110 |
| Feed: Diluent Ratio | 1:2 | 1:2 | 1:2 | 1:2 |
| Catalyst: | | | | |
| Conc. g. AlCl$_3$/100 cc | 0.22 | 0.22 | 0.22 | 0.22 |
| Vol. used, cc | 625 | 625 | 625 | 625 |
| Contact Time, Min | 116 | 120 | 120 | 54 |
| Polymer produced, gm | 26 | 75 | 105 | 143 |
| Percent Conversion | 10 | 29 | 40 | 55 |
| Catalyst Effici ncy, gm. polymer/gm. active cat | 19 | 55 | 80 | 105 |
| Mol. Wt. (Staudinger) | | 47,000 | 48,000 | 51,000 |
| Mol. Percent Unsat. (Bromination Method) | | 1.91 | 1.68 | 1.70 |
| Mooney Viscosity: | | | | |
| 1.5 Min | | 68 | 74 | |
| 8 Min | | 65 | 69 | |
| Cure at 307° F., 20 min.: | | | | |
| Tensile Strength | | 2,325 | 2,725 | 3,025 |
| 300% Modulus | | 730 | 510 | 560 |
| 400% Modulus | | 1,090 | 750 | 840 |
| Percent Elongation | | 730 | 740 | 850 |

These data indicate that the freezing out technique employing vinyl chloride as the feed and catalyst diluent is entirely feasible and practical and gives a good quality of polymer product. These data also show better utilization of unsaturation in feed at the lower temperatures. The mole percent unsaturation of the product is higher and the moduli of vulcanization are greater.

What is claimed is:

1. The process of preparing a solid plastic hydrocarbon interpolymer which comprises mixing together a major proportion of isobutylene with a minor proportion of a conjugated diolefin having from 4 to 6 carbon atoms per molecule, diluting said mixture with from 2 to 5 volumes of vinyl chloride per volume of olefinic reactants, and polymerizing said mixture by the application thereto of aluminum chloride dissolved in a solvent consisting predominantly of vinyl chloride, at a temperature of from 0° C. to —165° C.

2. The process of preparing a solid hydrocarbon interpolymer which comprises mixing together a major proportion of isobutylene and a minor proportion of a conjugated diolefin having from 4 to 6 carbon atoms per molecule, diluting the olefin mixture with from 2 to 5 volumes of vinyl chloride per volume of olefinic reactants, chilling said olefin reaction mixture to a temperature at which the olefins do not undergo substantial reaction in the presence of a polymerization catalyst, adding to said chilled reaction mixture a Friedel-Crafts polymerization catalyst dissolved in a liquid consisting predominantly of vinyl chloride and chilled to approximately the same temperature as said olefin reaction mixture, allowing said mixture of olefins and catalyst solution to warm up gradually whereby the copolymer is formed over a wide temperature range of approximately —150° C. to approximately —40° C., and recovering the polymer so formed over a comparatively wide temperature range.

3. A process according to that described in claim 2 in which the conjugated diolefin is butadiene.

4. A process according to that described in claim 2 in which the conjugated diolefin is isoprene.

5. The process of preparing a solid plastic hydrocarbon interpolymer which is reactive with vulcanization agents to yield an elastic product, which comprises mixing together from 99 to 40 weight percent of isobutylene and from 1 to 60 weight percent of isoprene, diluting said olefin mixture with from 2 to 5 volumes of vinyl chloride per volume of olefinic reactants and polymerizing the resulting mixture at a temperature between —150° C. and —40° C. by the addition thereto of a Friedel-Crafts catalyst dissolved in a liquid consisting predominantly of vinyl chloride.

6. The process of preparing a solid hydrocarbon interpolymer which comprises mixing together from 99 to 40 weight percent of isobutylene and from 1 to 60 weight percent of a conjugated diolefin having from 4 to 6, inclusive, carbon atoms per molecule, diluting the olefin mixture with from 2 to 5 volumes of vinyl chloride per volume of olefinic reactants, chilling said olefin reaction mixture to a temperature between —149° C. and 160° C., adding to said chilled reaction mixture a Friedel-Crafts polymerization catalyst dissolved in a liquid consisting predominantly of vinyl chloride and chilled to a temperature between —149° C. and 160° C., allowing said mixture of olefins and catalyst solution to warm up gradually to freeze out the polymer, meanwhile controlling the temperature to a 20 degree range on the centigrade scale, said range selected from between —149° C. and —40° C., and recovering the polymer so formed over the narrow temperature range.

7. The process of preparing a hydrocarbon polymer which comprises polymerizing an olefinic reaction mixture containing at least one polymerizable isomonoolefin and containing 2 to 5 volumes of vinyl chloride per volume of olefinic reactants as a diluent by the application thereto of a dissolved Friedel-Crafts polymerization catalyst at a temperature of from 0° C. to —165° C.

8. The process of preparing a hydrocarbon polymer which comprises polymerizing an olefinic reaction mixture containing a substantial amount of isobutylene diluted with 2 to 5 volumes of vinyl chloride per volume of olefinic reactants, by the application thereto of a Friedel-Crafts polymerization catalyst dissolved in a liquid consisting predominantly of vinyl chloride at a temperature of from 0° C. to —165° C.

9. The process of preparing a solid, plastic hydrocarbon interpolymer which is reactive with vulcanization agents which comprises reacting together a mixture of isobutylene and a conjugated diolefin having from 4 to 6 carbon atoms per molecule, the olefinic reactants being diluted with 2 to 5 volumes of vinyl chloride per volume of reactants, by the application thereto of a dissolved Friedel-Crafts catalyst at a temperature of from 0° C. to —165° C.

References Cited in the file of this patent

UNITED STATES PATENTS

| Number | Name | Date |
|---|---|---|
| 2,336,648 | Sparks | Dec. 14, 1943 |
| 2,554,245 | Dornte | May 22, 1951 |
| 2,561,729 | Dornte | July 24, 1951 |